United States Patent [19]
Watson

[11] Patent Number: 5,230,105
[45] Date of Patent: Jul. 27, 1993

[54] TOILET SEAT AND STAND FOR WILDERNESS CAMPING

[76] Inventor: Hugh A. Watson, 5 Wentworth Dr., Berkeley Heights, N.J. 07922

[21] Appl. No.: 24

[22] Filed: Jan. 4, 1993

[51] Int. Cl.⁵ .......................................... A47K 11/00
[52] U.S. Cl. .......................................... 4/460; 4/449; 297/440
[58] Field of Search .............. 297/440; 4/460, 479, 4/483, 484, 449

[56] References Cited

U.S. PATENT DOCUMENTS

| | | | |
|---|---|---|---|
| 1,521,740 | 1/1925 | Wernti et al. | 4/484 |
| 4,103,969 | 8/1978 | Glessner | 297/440 |
| 5,083,324 | 1/1992 | Strong | 4/460 |

FOREIGN PATENT DOCUMENTS

| | | | |
|---|---|---|---|
| 2046769 | 3/1972 | Fed. Rep. of Germany | 297/440 |
| 2143875 | 3/1973 | Fed. Rep. of Germany | 4/483 |

*Primary Examiner*—Henry J. Recla
*Assistant Examiner*—Charles R. Eloshway

[57] ABSTRACT

A portable toilet seat and stand for wilderness camping includes seat bar members, legs, and crosspieces designed to interlock under the weight of the user. A pair of feet are provided for engagement with the legs to prevent the legs from sinking into soft ground. The portable toilet and stand is lightweight and the disassembled parts may be bundled together in a stuff bag.

6 Claims, 3 Drawing Sheets

TOILET SEAT AND STAND FOR WILDERNESS CAMPING

FIELD OF THE INVENTION

The invention is a portable toilet seat and stand for use by wilderness campers.

BACKGROUND OF THE INVENTION

Many people find camping in the wilderness an enjoyable form of recreation. Sometimes the camping occurs in conjunction with hunting, fishing, canoe tripping, backpacking, nature study, or scouting. Others spend time in the wilderness in connection with their profession or employment.

For some people, however, the necessity to defecate in the wilderness without the convenience of a toilet or outhouse is a deterrent to the wilderness experience. Unfortunately, nature does not provide a ready substitute for the facility found in most bathrooms.

Additionally, because of the rapidly increasing occurrence of Lyme disease in North America, all wilderness campers need to be particularly careful to avoid exposure to deer ticks which are known to transmit the disease. Deer ticks frequently wait in wooded areas or grassy areas for a passing animal onto which they jump and attach themselves. Thus, a human responding to nature's call may acquire a deer tick in the process.

SUMMARY OF THE INVENTION

The invention consists of an assembly of parts which are easily and quickly put together without the use of screws or connectors to produce a rigid assembly. The assembly serves the function of a toilet seat and a stand which keeps the seat at a convenient distance above the ground. The invention can be easily disassembled and transported with other camping gear.

While a typical assembly uses ten parts, since some are of common design, they are based on only four different designs. The parts can be readily made from molded plastic, and the molding step is the only manufacturing step needed to make each part. This should lead to low manufacturing cost. There are no screws, springs, rivets, hinges or mechanical latches.

Each part is relatively long in comparison with its width and is designed to mate with another part or parts at each end. Each part has an axis of symmetry passing through its midpoint, which means it can be rotated end-for-end in the assembly. This makes assembly very easy, even after sundown when there may be almost no light to see by.

The design is such that, in use, the body weight of the user securely locks the members together to result in a rigid yet comfortable structure.

The parts are of comparably length, and when disassembled, they can be bundled together and placed in a matching stuff bag with a draw cord, similar to the stuff bags used to transport tents, sleeping bags, and other camping equipment.

An individual participating in a week-long wilderness camping trip in summer might take along camping equipment, food, clothing, and first aid items which would occupy a volume of 5 cubic feet (0.14 cubic meter) and weight 60 pounds (27kilograms). (This assumes that drinking water would be available at the camp site.) The invention, when transported in a stuff bag, could occupy a volume of approximately 0.15 cubic foot and weight approximately 2.5 pounds. Thus, it would be small in volume and light in weight in comparison with the other gear that the individual might take along.

Proper use of the invention should keep exposed parts of the human body well above ground level and substantially reduce the risk of acquiring a deer tick.

DETAILED DESCRIPTION

FIG. 1

The assembly consists of:

- two seat bars, 1, which serve the function of a toilet seat;
- two crosspieces, 2, which connect the seat bars in the assembly and which maintain the leg poles, 3, approximately perpendicular to the plane defined by the upper surfaces of the seat bars;
- four let poles, 3, which support the connected seat bars;
- two feet, 4, each of which supports and maintains the relative position of the lower ends of a pair of leg poles to result in a rigid assembly.

Each blade-like end, 5, of the crosspiece slides into a track, 6, on the underside of one of the seat bars. A stop constituted of protuberances, 7, on the crosspiece determines how far the crosspiece slides along track, 6.

The end of each crosspiece is provided with a hole, 8, which engages a leg pole. The crosspiece is sufficiently thick (top to bottom) in the region of the hole to ensure that the leg pole is rigidly held in a substantially vertical position. Considerable experimentation with the invention has shown that additional cross bracing of the leg poles is not necessary.

Figure 1:
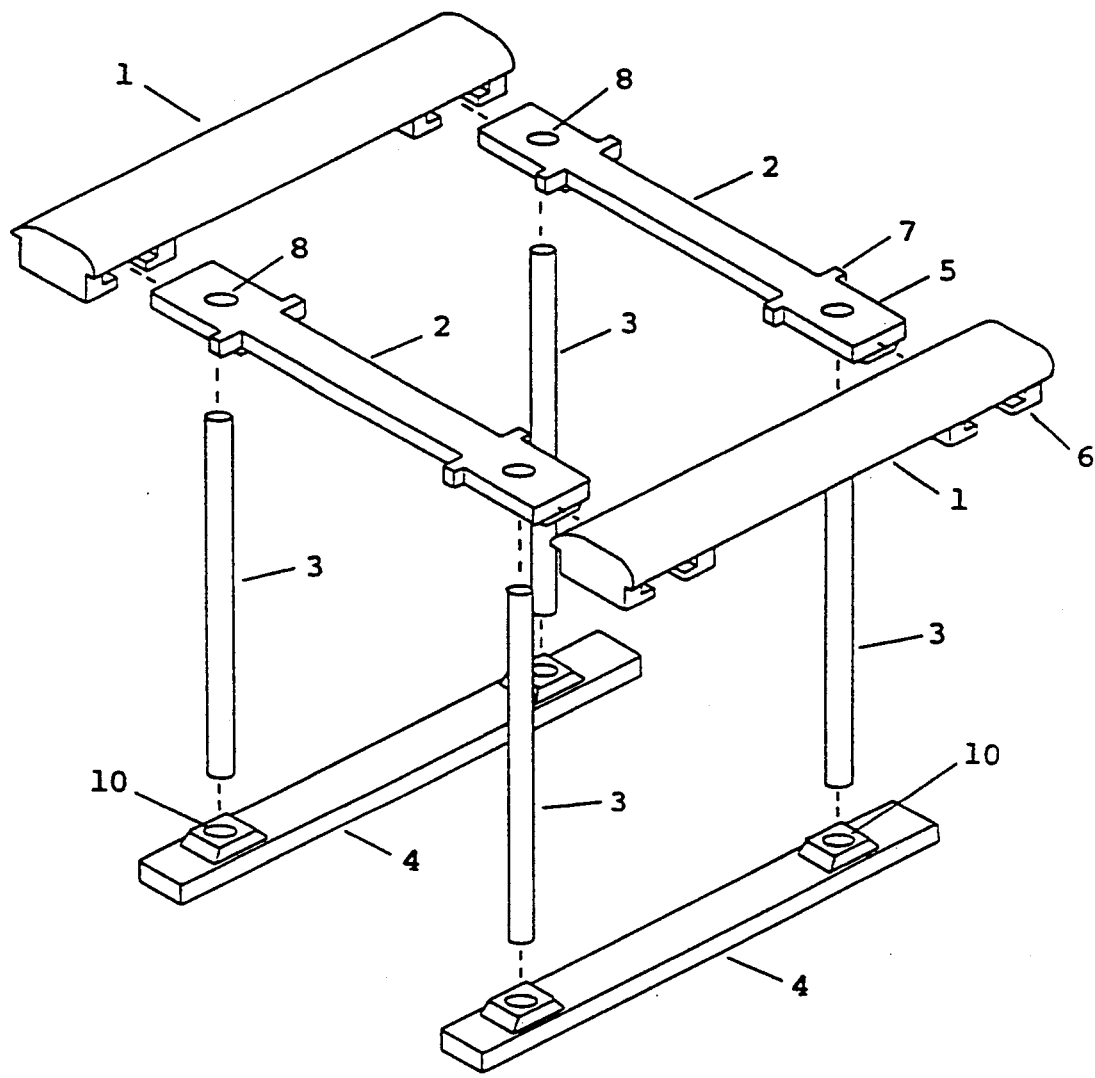
FIG. 1 shows how the parts are assembled together.
Figure 2:
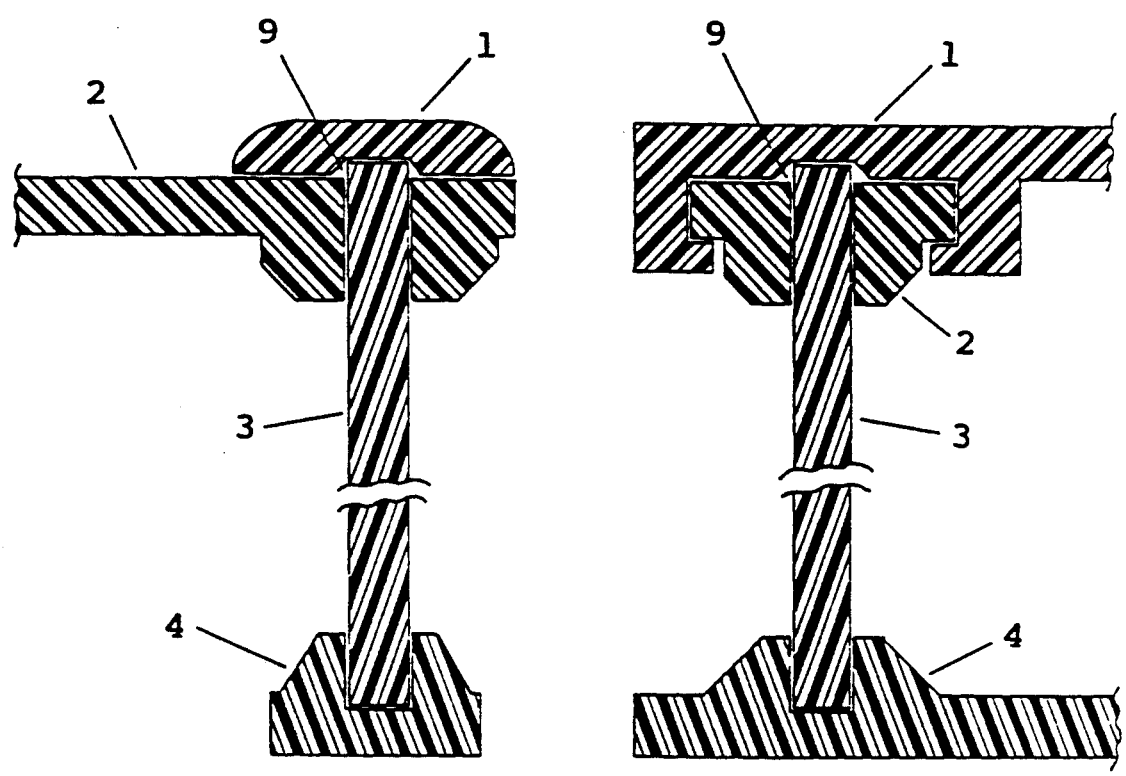
FIG. 2 shows two perpendicular cross-sectional views of one corner of the assembly.
Figure 3:
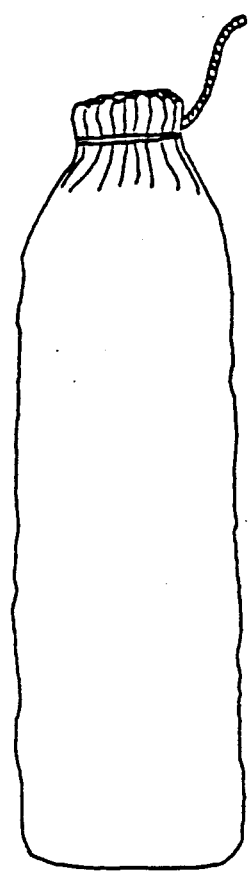
FIG. 3 shows a stuff bag containing the disassembled parts. Such a stuff bag might be used to transport the parts.

The upper end of each leg pole fits into a recess, 9, in the underside of the seat bar, as shown in FIG. 2. The lower end of each leg pole fits into a matching recess, 10, in one end of a foot, 4. The feet have sufficient area to prevent the unit from sinking into soft ground. The usual form of outdoor terrain provides the needed lateral stabilization of the feet.

The leg poles may be circular in cross section and could consist of hollow tubing to reduce weight.

After the assembled unit has been used, it is desirable to move it a short distance away from disassembly. A friction fit between the leg poles and the members with which they mate would permit the assembled unit to be picked up by the seat bars without having the leg poles and feet fall away. The friction fit might be realized by having the outer surface of the leg poles roughened or ridged at each end. If there is no friction fit, the unit must be picked up by the feet in order to avoid having it fall apart.

FIG. 2

This shows two perpendicular cross-sectional views of one corner of the assembly and illustrates how the parts mate together.

A person sitting on the seat bars will tend to make the seat bars spread apart. But, the holes at the two ends of the crosspieces determine the spacing between the two leg poles which pass through these holes, and each leg pole presses against a recess, 9, on the underside of a seat bar with the axial compressive force borne by the leg pole. This locks the three parts together so that there can be no relative motion of the parts. Only when the leg pole is slid out of the recess on the underside of the seat bar, can the crosspiece be separated from the seat bar.

When the crosspiece, seat bar, and leg pole are locked together, the long dimensions of these parts are mutually perpendicular.

FIG. 3

This shows a stuff bag containing the disassembled parts. Stored in this manner, the parts can be easily transported with other camping gear.

I claim:

1. Apparatus including parts which when assembled provides the function of a toilet seat and supporting stand, such parts consisting essentially of:
    two seat bars which serve the function of a toilet seat;
    two crosspieces which determine the spacing between the seat bars in the assembled unit and which hold leg poles perpendicular to the plane defined by the upper surfaces of the seat bars; four leg poles which support the seat bars; and
    two feet each of which interconnect and support the lower ends of a pair of leg poles and prevent the leg poles from sinking into soft ground;
    characterized in that the underside of each seat bar is provided with tracks which engage the crosspieces and in that the crosspieces are provided with apertures which engage the leg poles, such that in the assembled apparatus the leg poles press against a recess on the underside of the seat bars with the axial compressive force born by the leg poles and thereby lock the seat bars, crosspieces, and leg poles together to form a rigid assembly.

2. The apparatus of claim 1 in which at least the seat bars, crosspieces, and feet are made of molded plastic.

3. The apparatus of claim 1 in which the leg poles are of uniform cross section end to end.

4. The apparatus of claim 1 in which the leg poles consist essentially of molded plastic, wood, or metal tubing.

5. The apparatus of claim 1 in which the leg poles are roughened or ridged at each end so as to cause a friction fit with the members with which the leg poles mate.

6. The apparatus of claim 1 in which the seat bars, crosspieces, leg poles, and feet are essentially the same length.

* * * * *